(12) United States Patent
Moore et al.

(10) Patent No.: US 9,813,094 B2
(45) Date of Patent: Nov. 7, 2017

(54) WIDEBAND RECEIVER

(75) Inventors: George Stennis Moore, Veradale, WA (US); Paul L. Corredoura, Redwood City, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 874 days.

(21) Appl. No.: 13/410,154

(22) Filed: Mar. 1, 2012

(65) Prior Publication Data

US 2013/0230131 A1    Sep. 5, 2013

(51) Int. Cl.
H04B 1/30    (2006.01)
H04B 1/00    (2006.01)

(52) U.S. Cl.
CPC .............. *H04B 1/30* (2013.01); *H04B 1/0032* (2013.01)

(58) Field of Classification Search
CPC ........... H04B 1/16; H04B 1/30; H04B 1/0032
USPC ......... 375/350, 224, 316; 455/260, 293, 313
See application file for complete search history.

(56) References Cited

U.S. PATENT DOCUMENTS

| | | | | |
|---|---|---|---|---|
| 4,443,801 A * | 4/1984 | Klose | ........................ | G01S 3/46 342/378 |
| 4,972,431 A * | 11/1990 | Keegan | ................... | G01S 19/30 342/357.69 |
| 6,002,924 A * | 12/1999 | Takano | .................. | H03D 7/161 455/161.1 |
| 6,873,923 B1 * | 3/2005 | Roscoe | ................ | G06K 9/0053 702/189 |
| 6,925,295 B1 * | 8/2005 | Beghein | .................... | H04B 1/30 375/319 |
| 7,180,937 B2 * | 2/2007 | Matreci | ................. | H04L 27/364 375/224 |
| 7,302,237 B2 * | 11/2007 | Jackson et al. | .................. | 455/76 |
| 7,650,080 B2 * | 1/2010 | Yap | .......................... | G02F 2/02 398/161 |

(Continued)

FOREIGN PATENT DOCUMENTS

CN    101002383 A    7/2007
CN    101931771 A    12/2010

(Continued)

OTHER PUBLICATIONS

Office Action dated Mar. 18, 2016, China Patent Application No. 201310042885.7.

(Continued)

*Primary Examiner* — Daniel Washburn
*Assistant Examiner* — Berhanu Tadese (57) ABSTRACT

A receiver and method for identifying the frequency of an RF component in an RF signal are disclosed. The receiver includes a first mixer that receives an RF signal and mixes that RF signal with a first multi-tone LO signal that includes a plurality of tones to generate a mixed signal. The output of the first mixer is filtered by a first filter that removes signals outside of a predetermined band to generate a first IF signal. A processor determines the RF frequency of the component utilizing the first IF signal and a second IF signal generated using a second multi-tone LO signal having a different plurality of tones from said first multi-tone signal. The first and second multi-tone LO signals can be generated by clocking suitable digital sequences into the mixer either by using different sequences or by using the same sequence clocked at a different rate.

18 Claims, 6 Drawing Sheets

(56) References Cited

U.S. PATENT DOCUMENTS

| | | | |
|---|---|---|---|
| 8,080,782 B2* | 12/2011 | Hidalgo | H01J 49/0027 250/281 |
| 8,841,923 B1* | 9/2014 | Vanwiggeren | G01R 19/0053 324/606 |
| 2004/0087272 A1* | 5/2004 | Franca-Neto | H03B 27/00 455/18 |
| 2004/0095995 A1* | 5/2004 | Matreci et al. | 375/224 |
| 2004/0142663 A1* | 7/2004 | Roberts | H04B 1/7172 455/73 |
| 2004/0212358 A1* | 10/2004 | Stephen | H03J 7/32 324/76.19 |
| 2005/0003785 A1* | 1/2005 | Jackson | G01S 7/35 455/260 |
| 2005/0223306 A1* | 10/2005 | Franca-Neto | H04B 1/71632 714/784 |
| 2005/0226349 A1* | 10/2005 | Manku | H03D 7/16 375/316 |
| 2007/0081613 A1* | 4/2007 | Kim | H04B 1/71635 375/327 |
| 2007/0099570 A1* | 5/2007 | Gao | H04B 1/30 455/63.1 |
| 2007/0182424 A1* | 8/2007 | Benedikt | G01R 31/2822 324/637 |
| 2007/0248192 A1* | 10/2007 | Brunsch | H04L 25/40 375/340 |
| 2008/0090531 A1* | 4/2008 | Jungerman | H04L 27/364 455/126 |
| 2009/0061809 A1* | 3/2009 | Muhammad | H03G 7/00 455/313 |
| 2009/0061812 A1* | 3/2009 | VanWiggeren | G01R 19/0053 455/326 |
| 2009/0092177 A1* | 4/2009 | Dvorak | H04B 17/101 375/224 |
| 2009/0216468 A1* | 8/2009 | Anderson | G01R 23/165 702/57 |
| 2009/0253376 A1* | 10/2009 | Parssinen | H04W 72/02 455/62 |
| 2009/0290658 A1* | 11/2009 | Moore | H04L 27/12 375/295 |
| 2011/0202316 A1* | 8/2011 | Crooks | G01R 19/02 702/198 |
| 2011/0294453 A1* | 12/2011 | Mishali | H04B 1/0092 455/293 |
| 2012/0082251 A1* | 4/2012 | Vanden Bossche | G01R 13/0272 375/259 |
| 2013/0065542 A1* | 3/2013 | Proudkii | H03H 11/1291 455/78 |
| 2014/0273856 A1* | 9/2014 | Kyles | H04B 1/401 455/41.2 |

FOREIGN PATENT DOCUMENTS

| | | | | |
|---|---|---|---|---|
| NL | WO 2006092773 A2 * | 9/2006 | | H03J 1/0008 |
| WO | 2006/092773 A2 | 8/2006 | | |

OTHER PUBLICATIONS

Office Action dated Mar. 9, 2017, China Application No. 201310042865.7.

Search Report dated Feb. 27, 2017, China Application No. 201310042885.7.

Office Action dated Jul. 24, 2017, China application No. 201310042885.7.

* cited by examiner

WIDEBAND RECEIVER

BACKGROUND

One application of radio frequency (RF) receivers is to monitor the RF spectrum and identify unknown emitters. For example, in the battlefield, it would be advantageous to able to detect the presence of narrow-band push-to-talk radios, indicating the presence of enemy troops nearby. Once detected, the position of the unknown emitter could be estimated and/or the signal could be demodulated to determine the information content.

One prior art method for identifying a narrow-band transmission at an unknown frequency within a much larger frequency band utilizes a traditional heterodyne receiver that mixes a pure tone with the received RF signal to create a new intermediate frequency (IF), usually at a much lower frequency than the original RF signal. The new IF signal is filtered to remove higher frequency components from the mixing process before being amplified and digitized. The IF signal includes the RF sources within a narrow band of frequencies defined by the low-pass filter and the tone in question. To monitor a large band of the RF spectrum, the LO tone is stepped across the RF band of interest allowing the capture of one IF bandwidth worth of spectrum before the LO frequency is incremented and a new capture begins. For a receiver with 50 MHz IF bandwidth, it would take 20 such measurements to cover a 1 GHz span of RF frequencies.

For this strategy to succeed, the unknown signal must continue to broadcast for the period of time needed to sweep the RF spectrum. If the RF signal appears briefly at a frequency not presently being mixed into the IF band and this signal terminates before the appropriate LO sweep frequency occurs, it will not be detected.

Another option for monitoring a wideband portion of the RF spectrum utilizes a ultra fast analog-to-digital converter (ADC) which samples quickly enough to capture the entire RF band of interest without any aliasing. These ultra fast ADCs are typically used in high speed oscilloscopes. Today's oscilloscope ADCs can support sample rates of 80 Giga-samples-per-second (Gs/s) allowing monitoring of RF signals up to 30 GHz. Unfortunately, these ultra fast ADCs have a limited dynamic range, require high power, and have very high cost. The limited dynamic range negatively impacts the ability to detect a low power signal in the presence of higher power background signals. The high cost and high power requirements make such implementations unattractive for devices that are used in the field. In addition, the high volume of data generated by such systems requires significant computing resources to process, which further detracts from such solutions.

SUMMARY

The present invention includes a receiver and method for identifying the frequency of an RF component in an RF signal. The receiver includes a first mixer that receives an RF signal and mixes that RF signal with a first multi-tone local oscillator (LO) signal that includes a plurality of tones to generate a mixed signal. The receiver also includes a first LO signal generator that generates the first multi-tone LO signal. The output of the first mixer is filtered by a first filter that removes signals outside of a predetermined band from the mixed signal to generate a first IF signal. A processor determines an RF frequency of a component of the RF signal utilizing the first IF signal and a second IF signal generated using a second multi-tone LO signal having a different plurality of tones from said first multi-tone signal. The first and second multi-tone LO signals can be generated by clocking suitable digital sequences into the mixer either by using different sequences or by using the same sequence clocked at a different rate.

DETAILED DESCRIPTION

Figure 1:
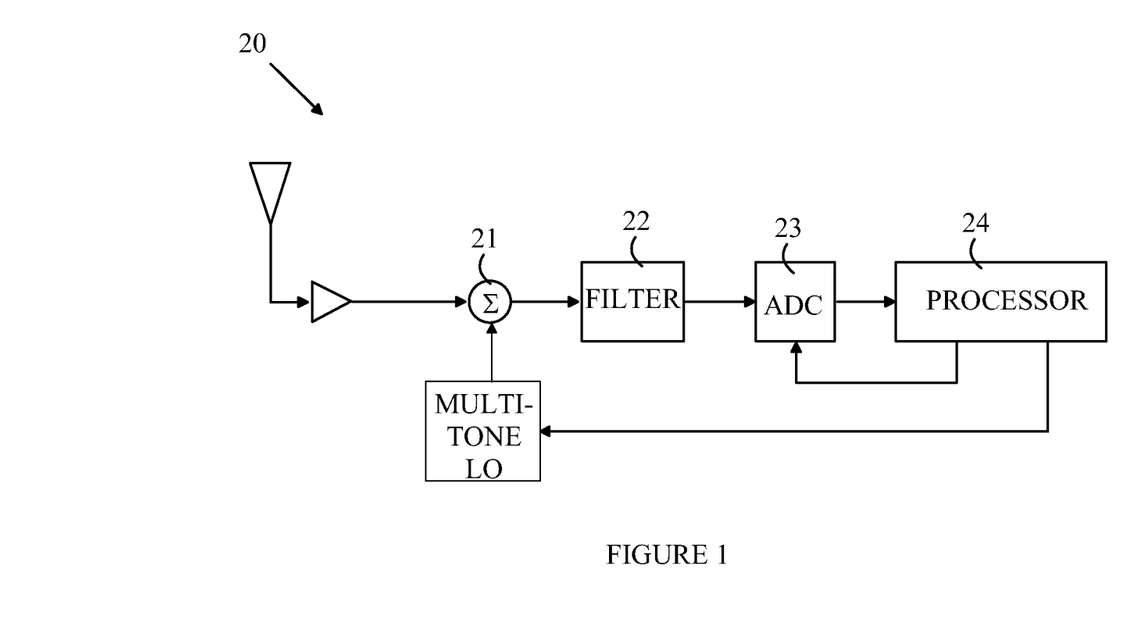
FIG. 1 illustrates a receiver configuration that can be utilized in the present invention.

The manner in which the present invention provides its advantages can be more easily understood with reference to FIG. 1, which illustrates a receiver configuration that can be utilized in the present invention. Receiver 20 receives an RF signal that is fed to a mixer 21. The LO signal consists of a multi-tone signal with tones that span the RF spectrum of interest. The output of the mixer is processed by a low pass filter 22 that is characterized by a bandpass frequency $F_b$ to generate an IF signal. The output of the low pass filter is digitized by ADC 23 whose output is processed by an FFT processor 24 to provide the frequencies of signals in the IF signal. For the purposes of this discussion, it will be assumed that the spacing between the tones in the LO signal is less than or equal to $F_b$. In this embodiment, the specific multi-tone LO signal that is used is controlled by processor 24, which also controls the ADC sampling rate.

The tones in the multi-tone LO signal are chosen such that for any RF frequency within the range of interest, there will always be an LO tone within $F_b$ of that frequency. When that tone mixes with the signal of interest, a mixing product that is within the bandpass of the low pass filter will be generated. It should be noted that many additional mixing products will be generated, but those products will be blocked by the low pass filter. Conversely, if there is a signal in the IF output, there is at least one corresponding signal in the RF band of interest. It should be noted that there could be two or more signals in the RF band that give rise to an IF frequency component that is the same for each signal, and hence, the IF frequency components may overlap and appear to be a single IF component.

Figure 2A:
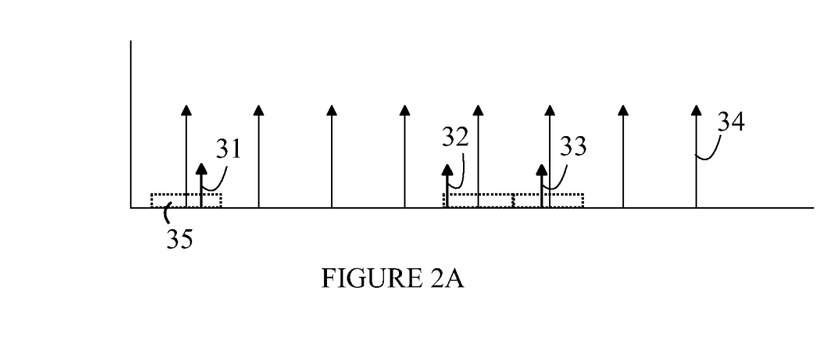
FIG. 2 illustrates the manner in which the receiver discussed in FIG. 1 compresses an RF spectrum.
Figure 2B:
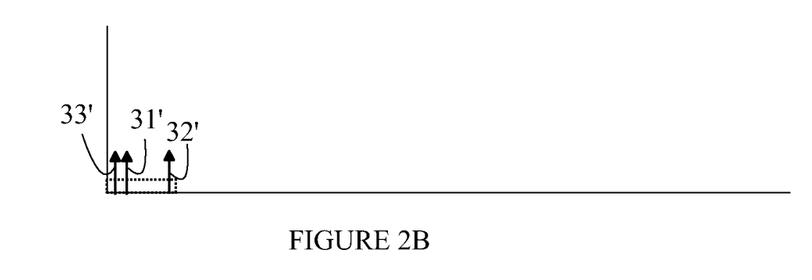

For example, refer to FIG. 2, which illustrates the manner in which the receiver discussed in FIG. 1 compresses an RF spectrum. The RF spectrum shown in FIG. 2A consists of the output of three transmitters that transmit at widely separated frequencies, as shown at 31-33. The frequencies of the mixing tones are shown by the large arrows such as arrow 34. The bandpass of filter 22 is shown at 35. The resulting IF spectrum is shown in FIG. 2B. The IF frequency components corresponding to frequencies 31-33 are shown at 31'-33', respectively.

While this compression strategy ensures that any signal in the broad RF band will generate a signal in the compressed band, as noted above, the number of signals in the compressed band may appear to be less than the number of signals in the RF band, since one or more of the signals in the compressed band may lie on top of one another. In addition, the frequency of a signal in the compressed band does not uniquely specify the corresponding frequency in the RF band of interest, since the compressed component could be the result of the mixing of the RF signal with any of the LO tones.

To simplify the following discussion, the frequencies of the tones in the LO signal will be referred to as the comb frequencies. The $i^{th}$ comb frequency will be denoted by $C_i$. The number of comb frequencies will be denoted by $N_c$. The observed frequencies in the IF band will be denoted by $f_i$, where i runs from 1 to $N_{IF}$. A signal at $f_i$ could have been the result of an RF frequency at $f_i+C_j$ for j=1 to $N_c$. Hence, some mechanism must be utilized to decide on the correct value of j, if the corresponding RF signal is to be located.

Consider the case in which the same RF signal is compressed using a different set of comb frequencies. To distinguish the first set of comb frequencies from the second set, denote the first set of comb frequencies by $^1C_j$ and the second set of comb frequencies by $^2C_j$. Similarly, denote the frequencies in the first compressed signal by $^1f_i$ and the frequencies in the second compressed signal by $^2f_i$.

From the first compression spectrum, there are candidate RF frequencies at frequencies $^1f_i+/-^1C_j$ for all allowed values of i and j. Similarly, there are candidate RF frequencies at frequencies $^2f_k+/-^2C_m$ for all allowed values of k and m. The real RF frequencies give rise to frequencies in both spectra. Consider the candidate frequency $^1f_i+^1C_j$ for given values of i and j. If $^2f_k+^2C_m$ is not equal to $^1f_i+^1C_j$ for some choice of k and m, then the candidate frequencies $^1f_i+^1C_j$ can be eliminated from consideration. Hence, by comparing the candidate frequencies corresponding to one compressed spectrum with the candidate frequencies corresponding to another compressed spectrum generated with a different comb frequency set, the candidate frequencies for the RF signals can be narrowed. The number of comb sets needed to resolve the entire RF spectrum will in general depend on the complexity of the spectrum. It should be noted that once an RF frequency of interest is identified, processor 24 can verify the candidate frequency by switching the LO signal generator to a single tone at a frequency with $F_b$ of the candidate frequency.

Figure 3:
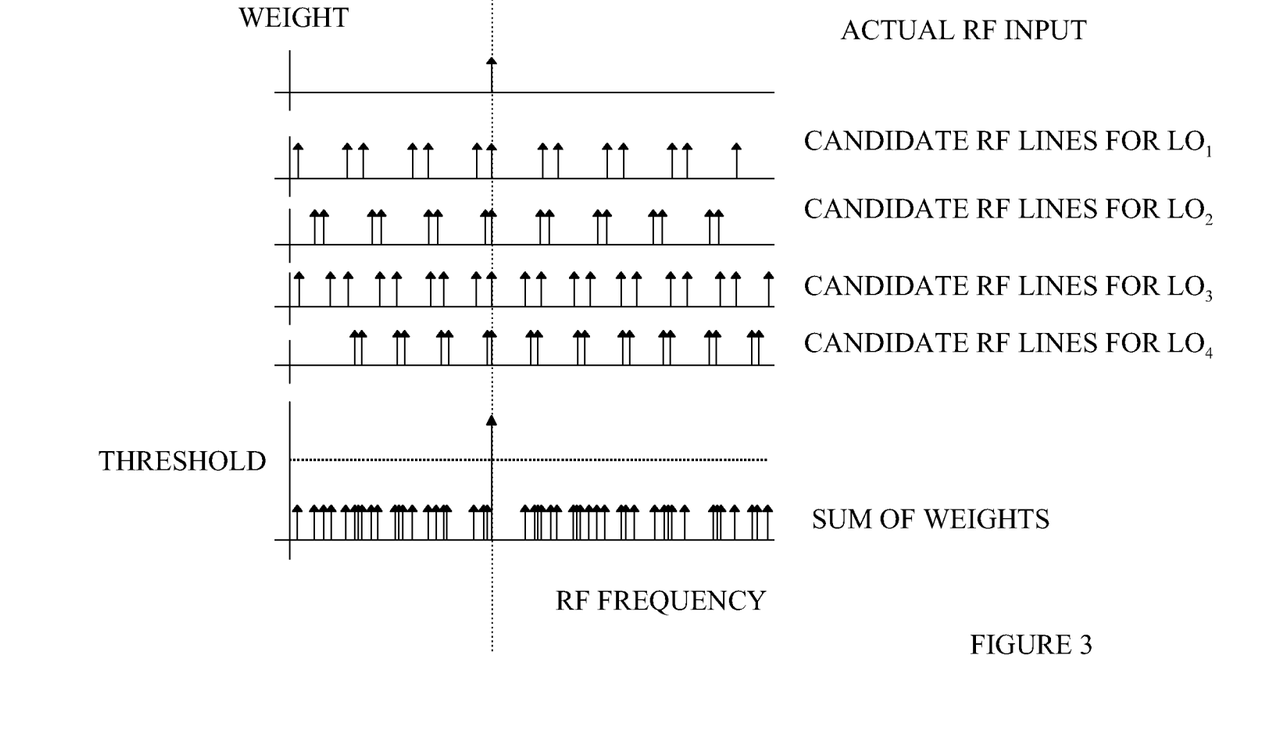
FIG. 3 illustrates one algorithm for reconstructing the RF frequency from the frequencies observed in the compressed frequency spectrum.

When only one tone is present, the location of the signal may be determined by a relatively simple algorithm. This method starts by dividing the RF spectrum into bins. As noted above, each frequency in the compressed IF spectrum could have arisen from any of $N_c$ RF frequencies. Hence, for each LO frequency pattern, a value is entered at each of the bins corresponding to one of the candidate RF frequencies. FIG. 3 illustrates the patterns corresponding to four different LO multi-tone signals for a single emitter input. Each value is shown as an arrow in each corresponding alias bin. To determine the actual RF frequency, the values in the corresponding bins for each LO pattern are added together to provide a "Sum" histogram. In general, the components in the correct location will add constructively and the others will be dispersed across the spectrum. The correct RF frequency will correspond to the frequency for which the sum is greatest.

When more than one tone is present, more sophisticated means for determining the number and locations of the emitters may be required. Statistical inference algorithms may be utilized to realize this capability. For example, methods analogous to those described in U.S. Pat. No. 8,080,782 may be employed.

The above-described embodiments depend on being able to generate compressed spectrums utilizing different LO comb sets. If the transmissions to be observed are continuous over a long enough period of time, the spectrums can be formed serially by first generating a compressed spectrum with a first LO comb set and then generating a second compressed spectrum utilizing a second LO comb set. However, if the goal of the apparatus is to detect RF transmissions that are of insufficient duration to allow such a serial approach, then a receiver that has multiple compressing receivers can be utilized.

Figure 4:
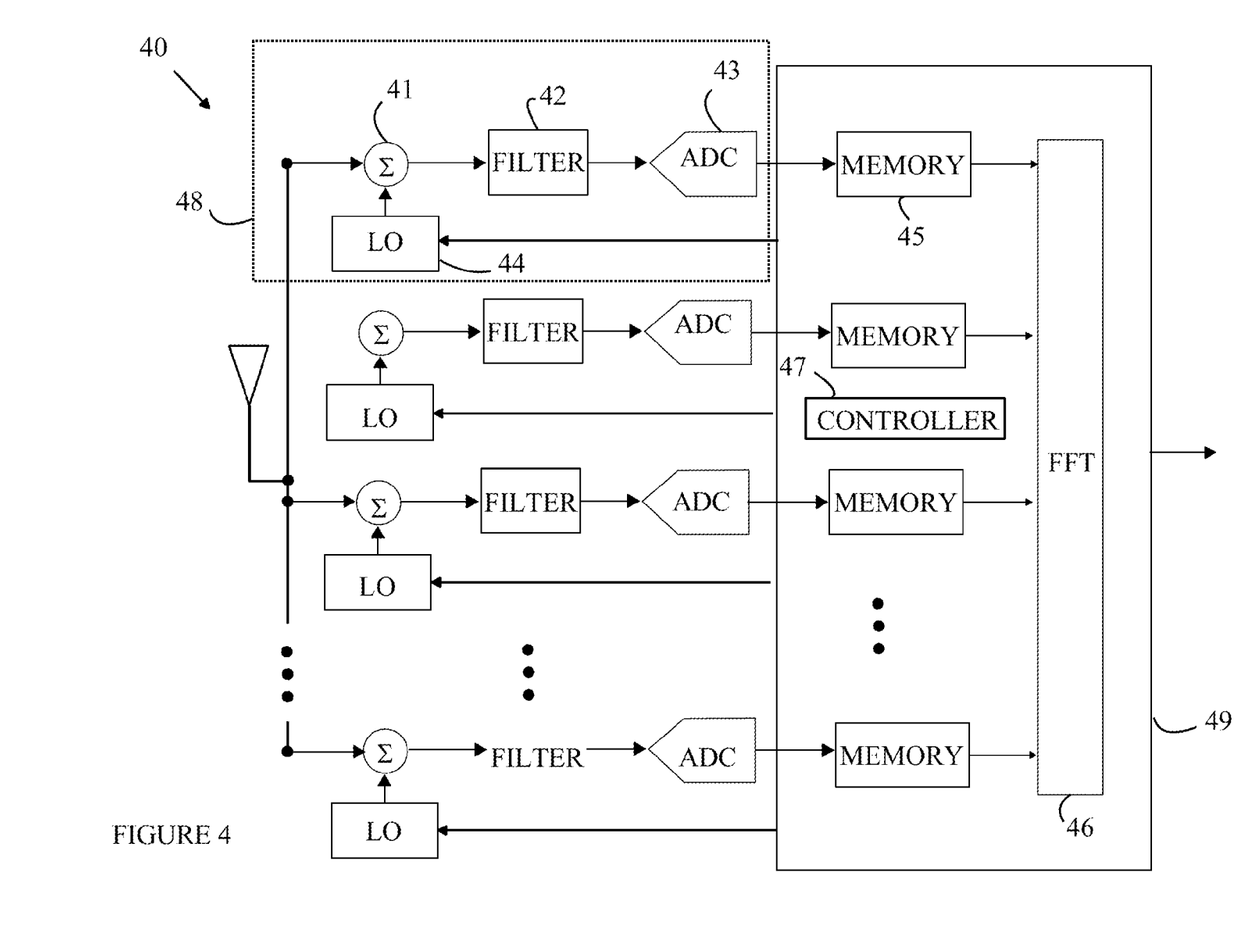
FIG. 4 illustrates an embodiment of a survey receiver according to the present invention.

Refer now to FIG. 4, which illustrates another embodiment of a survey receiver according to the present invention. Receiver 40 includes N compression receivers, of which compression receiver 48 is typical. Each compression receiver includes a mixer 41, a low-pass filter 42, and an ADC 43. Each compression receiver also includes an LO generator 44. The LO signals used by the different compression receivers are different and are controlled by processor 49. Hence, compressed spectra having the different LO comb patterns can be generated in parallel. The output of the ADC in each compression receiver is processed by processor 49 that stores the ADC outputs in memories such as memory 45. Processor 49 also includes an FFT processor 46 that performs the relevant FFTs on the ADC outputs and derives the RF frequencies from the compressed outputs. Windowing functions or the more generalized windowing method filter banks may also be applied to reduce spectral leakage to neighboring FFT bins. An internal controller 47 executes the various algorithm used to identify the RF frequencies from the compressed spectra utilizing an algorithm such as that discussed above.

Figure 5:
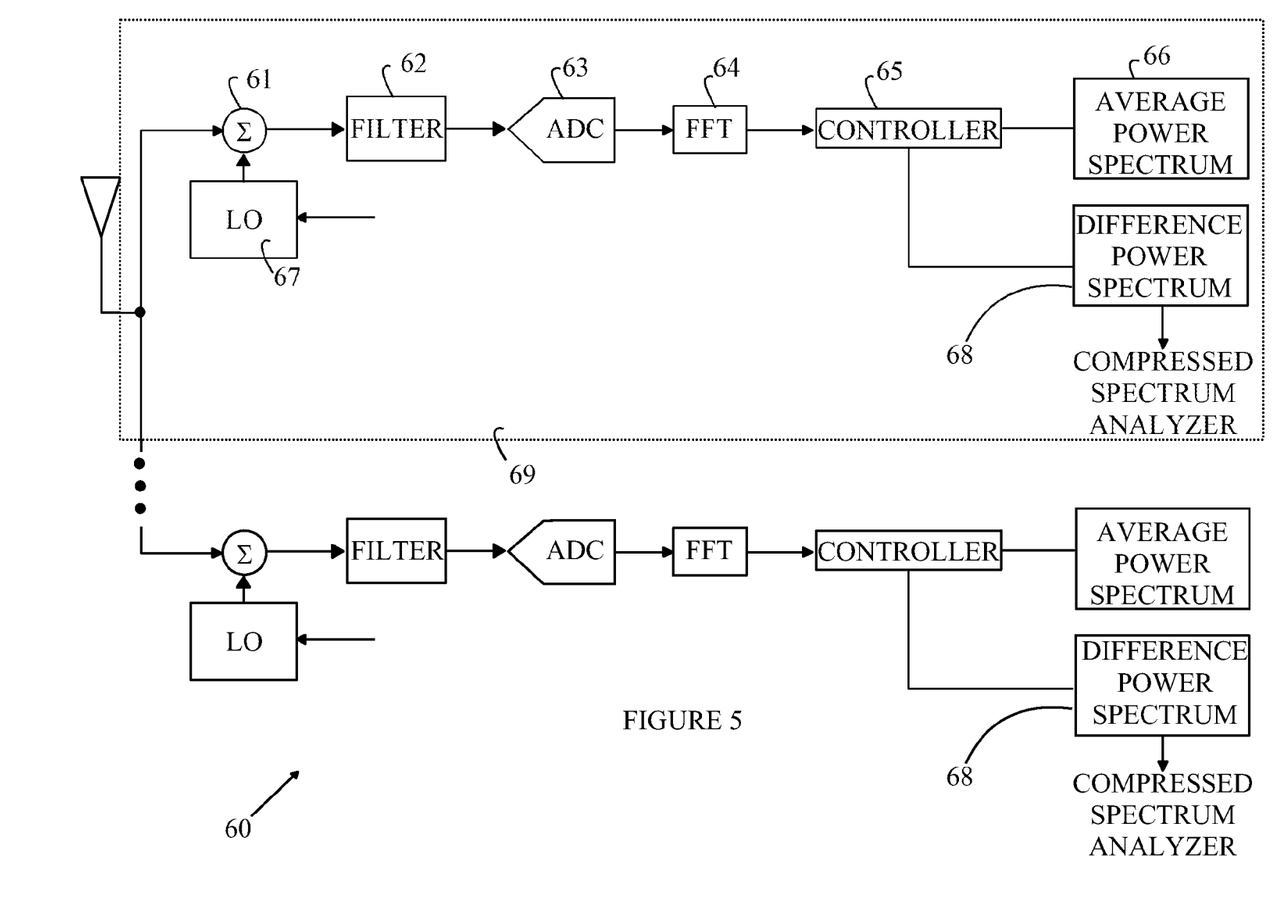
FIG. 5 illustrates another embodiment of survey receiver according to the present invention.

The above-described embodiments are directed to a spectrum analyzer that identifies each of the RF carriers that are active in a wide band of frequencies. In some cases, the number of RF signals will be quite large, and the goal will be to identify new signals that appear. Refer now to FIG. 5, which illustrates another embodiment of survey receiver according to the present invention. Receiver 60 also includes a plurality of compression receivers such as compression receiver 69. Each compression receiver includes a mixer 61 that mixes an LO signal from LO signal generator 67 with the received RF signal. The LO signals differ from compression receiver to compression receiver in a manner analogous to that described above. A low pass filter 62 removes mixing products outside the band of interest. The output of filter 62 is digitized by ADC 63. Groups of samples from ADC 63 are then Fourier transformed via FFT processor 64 to provide a compressed IF spectrum. A controller 65 uses the compressed IF spectrum to update an average power spectrum stored in a memory 66. The controller also subtracts the latest compressed IF power spectrum from average power spectrum 66 to generate a difference power spectrum that is stored in memory 68. The difference power spectrum suppresses spectral lines that are present over periods of time that are long compared to the time interval over which the individual compressed IF power spectra are generated. The various difference power spectrums are analyzed by a compressed spectrum analyzer to determine the RF frequencies of the new signals.

While the embodiments shown in FIG. 5 utilize separate controllers and a compression analyzer that is not shown, it is to be understood that these functions could be part of a common controller and/or processor in a manner analogous to that described above.

Figure 6:
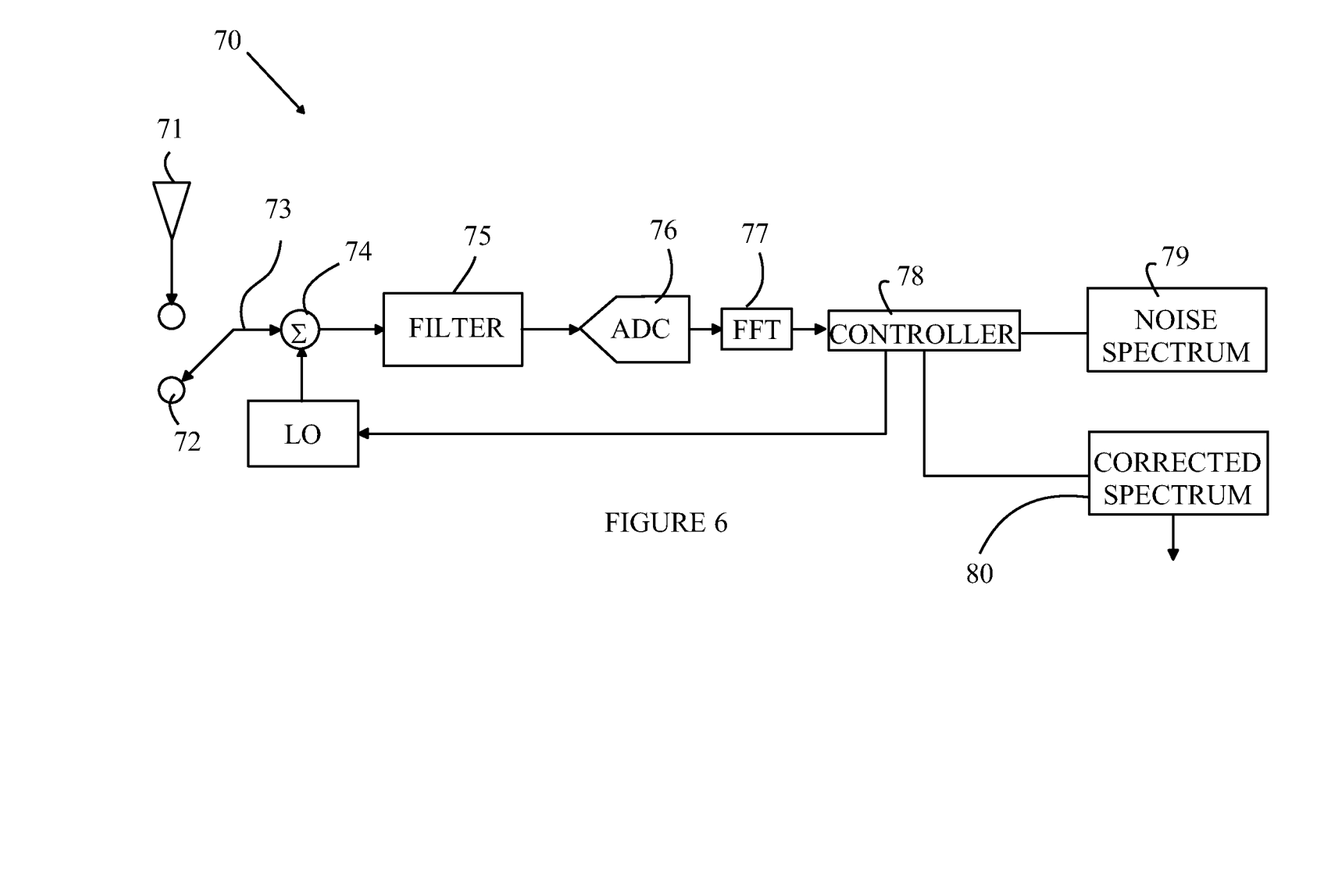
FIG. 6 illustrates an embodiment of a compression receiver according to the present invention.

A compression processor that is analogous to those discussed above with reference to FIG. 5 can also be used to correct for noise in the compressed spectrum. It should be noted that the spectral compression process also compresses noise into the IF band. Hence, providing corrections for the noise is more important in the compression receiver than in a typical IF receiver. Refer now to FIG. 6, which illustrates another embodiment of a compression receiver according to the present invention. Compression receiver 70 includes a switch 73 that switches the input to mixer 74 between the RF input 71 and a background input 72. Controller 78 controls switch 73. In a first mode, switch 73 is connected to source 72. The input is mixed with a multi-tone LO in a manner analogous to that described above and the output filtered via IF filter 75. The output of IF filter 75 is digitized via ADC 76 whose sampling rate is also controlled by controller 78. The output of ADC 76 over some predetermined time period or number of samples is then transformed by FFT processor 77 to generate a spectrum that is input to controller 78. This noise spectrum is stored in memory 79.

It should be noted that noise spectrum 79 captures the noise from the various components including any amplifiers and any spurs caused by the digitization of the output of filter 75. During normal operation, switch 73 is connected to RF source 71 and the output of FFT processor 77 is corrected for the noise spectrum stored in memory 79 to provide a corrected compressed spectrum 80. In addition any spurs generated from the receiver hardware can be adaptively cancelled and substantially removed from the response since the entire received spectrum is always being observed. Periodic monitoring of the internal spurs would allow updating the adaptive cancelling.

The above-described embodiments of the present invention utilize an LO signal generator that generates a plurality of different multi-tone LO signals. One class of signals that can be utilized to create the LO signals with different characteristics is the class of binary pseudo-random sequences. These sequences are sequences of ones and zeros that generate a spectrum having equally spaced tones. The spacing of the tones depends on the length of the sequences. The difference in frequencies between the tones depends on the rate the sequence is clocked into the mixer. Hence, by changing either the sequence length or clocking speed, LO signals having different inter-tone spacing can be realized. Zadoff-Chu sequences could also be utilized to generate a suitable multi-tone LO signal. The optimal choice of sequence will depend on the specific application.

The above-described embodiments are directed to finding the RF frequency of a signal in the broad band RF spectrum being monitored and then tracking that signal by converting one of the compression receivers to a traditional heterodyne receiver by substituting a monotone LO signal of the appropriate frequency for the multi-tone signal. However, in some cases, it may be preferred to use the compressed spectrum to decode the signal.

A compression receiver according to the present invention is particularly well adapted for identifying and tracking "frequency hopping" communication signals. This type of communication is utilized in secure environments to hide transmissions, since carrier frequency changes on a predictable basis that is known to the receiver and transmitter, but not to an outside observer. As long as each new frequency is contained within the monitored RF band, the transmission will always appear in the compressed spectrum. If the amplitude of the signal at a new frequency is greater than the amplitudes of any other IF signals occupying the same frequency bins, the IF signal can be mixed in the digital domain and demodulated to allow the new frequency signal to be demodulated.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A receiver comprising:
   a first mixer that receives an RF signal, and mixes that RF signal with a first multi-tone LO signal comprising a plurality of tones of different frequencies to generate a mixed signal;
   a first LO signal generator, said first LO signal generator generating said first multi-tone LO signal;
   a first filter that removes signals outside of a predetermined band from said mixed signal to generate a first IF signal; and
   a processor that determines an RF frequency of a component of said RF signal utilizing said first IF signal and a second IF signal generated using a second multi-tone signal having a different plurality of tones from said first multi-tone LO signal.

2. The receiver of claim 1 wherein said processor causes said first LO signal generator to generate said second multi-tone LO signal.

3. The receiver of claim 1 wherein said first LO signal generator generates a single tone signal in place of said first multi-tone LO signal in response to a control signal from said processor.

4. The receiver of claim 1 further comprising:
   a second mixer that receives an RF signal, and mixes that RF signal with said second multi-tone LO signal comprising a plurality of tones to generate a mixed signal;
   a second LO signal generator, said LO signal generator generating said second multi-tone LO signal; and
   a second filter that removes signals outside of a predetermined band from said mixed signal to generate second IF signal.

5. The receiver of claim 1 wherein said first LO multi-tone signal comprises a digital sequence that is input to said first mixer at a first clock rate.

6. The receiver of claim 5 wherein said second LO multi-tone signal comprises said digital sequence that is input to said first mixer at a second clock rate that is different from said first clock rate.

7. The receiver of claim 5 wherein said digital sequence is chosen from the group consisting of binary pseudo-random sequences or Zadoff-Chu sequences.

8. The receiver of claim 1 wherein said processor generates:
   a first RF power spectrum from said first IF signal over a first time interval,
   an average first RF power spectrum by combining a plurality of said first RF spectra generated over different time intervals, and
   a difference RF power spectrum comprising a difference between said first RF power spectrum and said average first RF power spectrum, said difference power spectrum being utilized by said processor to identify said RF frequency.

9. The receiver of claim 8 wherein said average first RF power spectrum is updated with said first RF power spectrum each time a first RF power spectrum is generated over a new time interval.

10. The receiver of claim 1 further comprising a switch that connects an input to said first mixer from said RF signal to a noise source, wherein said processor determines a noise spectrum from said first IF signal when said first mixer is connected to said noise source and wherein said processor corrects said first IF signal for noise based on said noise spectrum when said first mixer is connected to said RF signal.

11. A method for determining an RF frequency of a component of an RF signal, said method comprising:
mixing said RF signal with a first multi-tone LO signal comprising a plurality of tones to generate a first mixed signal;
filtering said first mixed signal to remove signals outside of a predetermined band from said first mixed signal to generate a first IF signal;
mixing said RF signal with a second multi-tone LO signal comprising a plurality of tones to generate a second mixed signal;
filtering said second mixed signal to remove signals outside of a predetermined band from said second mixed signal to generate a second IF signal; and
determining said RF frequency of a component of said RF signal utilizing said first IF signal and second IF signal, wherein said second multi-tone signal has a different plurality of tones from said first multi-tone signal.

12. The method of claim 11 further comprising mixing said RF signal with a single tone LO signal to tune said RF frequency component after determining said RF frequency of said component.

13. The method of claim 11 wherein said first LO multi-tone signal comprises a digital sequence that is mixed with said RF signal at a first clock rate.

14. The method of claim 13 wherein said second LO multi-tone signal comprises said digital sequence that is mixed with RF signal at a second clock rate that is different from said first clock rate.

15. The method of claim 13 wherein said digital sequence is chosen from the group consisting of binary pseudo-random sequences and Zadoff-Chu sequences.

16. The method of claim 11 further comprising generating:
a first RF power spectrum from said first IF signal over a first time interval,
an average first RF power spectrum by combining a plurality of said first RF power spectra generated over different time intervals, and
a difference RF power spectrum comprising a difference between said first RF power spectrum and said average first RF power spectrum, said difference power spectrum being utilized to identify said RF frequency.

17. The method of claim 16 wherein said average first RF spectrum is updated with said first RF spectrum each time a first RF spectrum is generated over a new time interval.

18. The method of claim 11 further comprising
determining a noise spectrum from said first IF signal by mixing a noise source with said first multi-tone LO signal and utilizing said noise spectrum to correct said first IF signal for noise based on said noise spectrum when said RF signal is mixed with said first multi-tone LO signal.

* * * * *